US010080180B2

(12) United States Patent
Burbidge et al.

(10) Patent No.: US 10,080,180 B2
(45) Date of Patent: Sep. 18, 2018

(54) SYSTEMS AND METHODS FOR VARIED CELL BARRING TIMES

(71) Applicant: Intel IP Corporation, Santa Clara, CA (US)

(72) Inventors: Richard Burbidge, Oxfordshire (GB); Marta Martinez Tarradell, Hillsboro, OR (US); Youn Hyoung Heo, Seoul (KR)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/119,941

(22) PCT Filed: Jun. 25, 2015

(86) PCT No.: PCT/US2015/037735
§ 371 (c)(1),
(2) Date: Aug. 18, 2016

(87) PCT Pub. No.: WO2016/018542
PCT Pub. Date: Feb. 4, 2016

(65) Prior Publication Data
US 2017/0135024 A1    May 11, 2017

Related U.S. Application Data

(60) Provisional application No. 62/029,944, filed on Jul. 28, 2014.

(51) Int. Cl.
*H04W 48/04* (2009.01)
*H04W 48/20* (2009.01)

(52) U.S. Cl.
CPC .......... *H04W 48/04* (2013.01); *H04W 48/20* (2013.01)

(58) Field of Classification Search
CPC .............................. H04W 48/04; H04W 48/20
See application file for complete search history.

(56) References Cited

U.S. PATENT DOCUMENTS

| 9,661,525 B2 * | 5/2017 | Rajadurai ......... H04W 28/0289 |
| 9,918,271 B2 | 3/2018 | Yang et al. |
| 2005/0053029 A1 * | 3/2005 | Lee ..................... H04W 74/008 370/328 |
| 2010/0190497 A1 * | 7/2010 | Pudney ................. H04W 12/08 455/435.1 |

(Continued)

OTHER PUBLICATIONS

PCT International Preliminary Report on Patentability dated Jan. 31, 2017 in connection with PCT Application No. PCT/US2015/037735, p. 1-10.

(Continued)

*Primary Examiner* — Kamran Afshar
*Assistant Examiner* — Minjung Kim
(74) *Attorney, Agent, or Firm* — Eschweiler & Potashnik, LLC

(57) ABSTRACT

A user equipment having varied cell barring times is disclosed. The system includes circuitry and a control unit. The circuitry is configured to attempt cell selection of a cell and obtain barring information associated with the cell upon the cell being barred. The control unit is configured to initial selection of the cell and to determine a varied barring time at least partially based on the barring information and system characteristics upon the cell being barred.

18 Claims, 7 Drawing Sheets

(56) References Cited

U.S. PATENT DOCUMENTS

| | | | | |
|---|---|---|---|---|
| 2011/0287765 | A1* | 11/2011 | Russell | H04W 60/04 455/435.1 |
| 2012/0040643 | A1 | 2/2012 | Diachina et al. | |
| 2012/0122906 | A1 | 5/2012 | Miura et al. | |
| 2012/0252455 | A1 | 10/2012 | Martin et al. | |
| 2012/0281531 | A1* | 11/2012 | Susitaival | H04W 48/06 370/230 |
| 2012/0307632 | A1 | 12/2012 | Guo et al. | |
| 2013/0040597 | A1* | 2/2013 | Jang | H04W 48/02 455/404.1 |
| 2013/0122906 | A1* | 5/2013 | Klatt | H04W 48/02 455/435.1 |
| 2013/0143548 | A1 | 6/2013 | Rayavarapu et al. | |
| 2013/0331099 | A1* | 12/2013 | Iwamura | H04W 48/02 455/434 |
| 2014/0099912 | A1* | 4/2014 | Lee | H04W 48/08 455/404.1 |
| 2014/0177429 | A1* | 6/2014 | Patil | H04W 76/027 370/216 |
| 2014/0280937 | A1* | 9/2014 | Miller | H04W 4/22 709/225 |
| 2015/0004924 | A1* | 1/2015 | Kim | H04W 48/06 455/404.1 |
| 2015/0036489 | A1* | 2/2015 | Rajadurai | H04W 28/0205 370/230 |
| 2015/0156692 | A1* | 6/2015 | Kim | H04W 8/02 455/436 |
| 2015/0215843 | A1* | 7/2015 | Lee | H04W 48/02 370/328 |

OTHER PUBLICATIONS

PCT Search Report dated Oct. 28, 2015 in connection with PCT Application No. PCT/US2015/037735, p. 1-3.

PCT Written Opinion dated Oct. 28, 2015 in connection with PCT Application No. PCT/US2015/037735, p. 1-9.

ETSI TS 136 304 v.9.1.0. "LTE: E-UTRA: User Equipment (UE) Procedures in Idle Mode (3GPP TS 36.304 version 9.1.0. Release 9)", Jan. 5, 2010, p. 1-33.

"Impact of public safety use case on the cell baring mechanism." Source: EADS. Agenda Item 6.2.1. 3GPP TSG RAN WG2 #85, Feb. 10 to Feb. 14, 2014, Prague, Czech Republic. R2-140399. 6 pages.

Extended European Search Report dated Jan. 24, 2018 for European Patent Application 15826440.8.

3rd Generation Partnership Project; Technical Specification Group Radio Access Network; Evolved Universal Terrestrial Radio Access (E-UTRA); User Equipement (UE) procedures in idle mode (Release 12). 3GPP TS 36.304 V12.1.0 (Jun. 2014).

3rd General Partnership Project; Technical Specification Group Radio Access Network; Evolved Universal Terrestrial Radio Access (E-UTRA); Radio Resource Control (RRC); Protocol specification (Release 12). 3GPP TS 36.331 v12.20.0 (Jun. 2014). pp. 1-84.

3rd General Partnership Project; Technical Specification Group Radio Access Network; Evolved Universal Terrestrial Radio Access (E-UTRA); Radio Resource Control (RRC); Protocol specification (Release 12). 3GPP TS 36.331 v12.20.0 (Jun. 2014). pp. 85-168.

3rd General Partnership Project; Technical Specification Group Radio Access Network; Evolved Universal Terrestrial Radio Access (E-UTRA); Radio Resource Control (RRC); Protocol specification (Release 12). 3GPP TS 36.331 v12.20.0 (Jun. 2014). pp. 169-252.

3rd General Partnership Project; Technical Specification Group Radio Access Network; Evolved Universal Terrestrial Radio Access (E-UTRA); Radio Resource Control (RRC); Protocol specification (Release 12). 3GPP TS 36.331 v12.20.0 (Jun. 2014). pp. 253-336.

3rd General Partnership Project; Technical Specification Group Radio Access Network; Evolved Universal Terrestrial Radio Access (E-UTRA); Radio Resource Control (RRC); Protocol specification (Release 12). 3GPP TS 36.331 v12.20.0 (Jun. 2014). pp. 337-365.

* cited by examiner

SYSTEMS AND METHODS FOR VARIED CELL BARRING TIMES

RELATED APPLICATIONS

This application claims the priority to International Patent Application No. PCT/US2015/037735 filed Jun. 25, 2015, which claims priority to U.S. Provisional Application No. 62/029,944, filed Jul. 28, 2014 entitled "Systems and Method for Varied Cell Barring Times" in the name of Richard Burbidge, et al. and is hereby incorporated by reference in its entirety.

BACKGROUND

A communication system may consist of an arrangement of cells where each cell is associated to a network node typically referred to as a basestation. Communication devices rely on an association with a cell (or sometimes more than one cell) for communication. A mobile device attempts to select or reselect a cell and the selection or reselection can be successful or unsuccessful. If successful, the selected or reselected cell may be used for communication by the device. If unsuccessful, which is also referred to as the cell being barred, the cell cannot be used. However, the UE can attempt to select or reselect the cell at a later time.

The mobile device is required to wait a fixed duration of time before re-attempting to select or reselect the cell. Waiting the fixed duration of time can degrade communication performance.

What is needed are techniques to enhance performance for cell selection.

DETAILED DESCRIPTION

Figure 1:
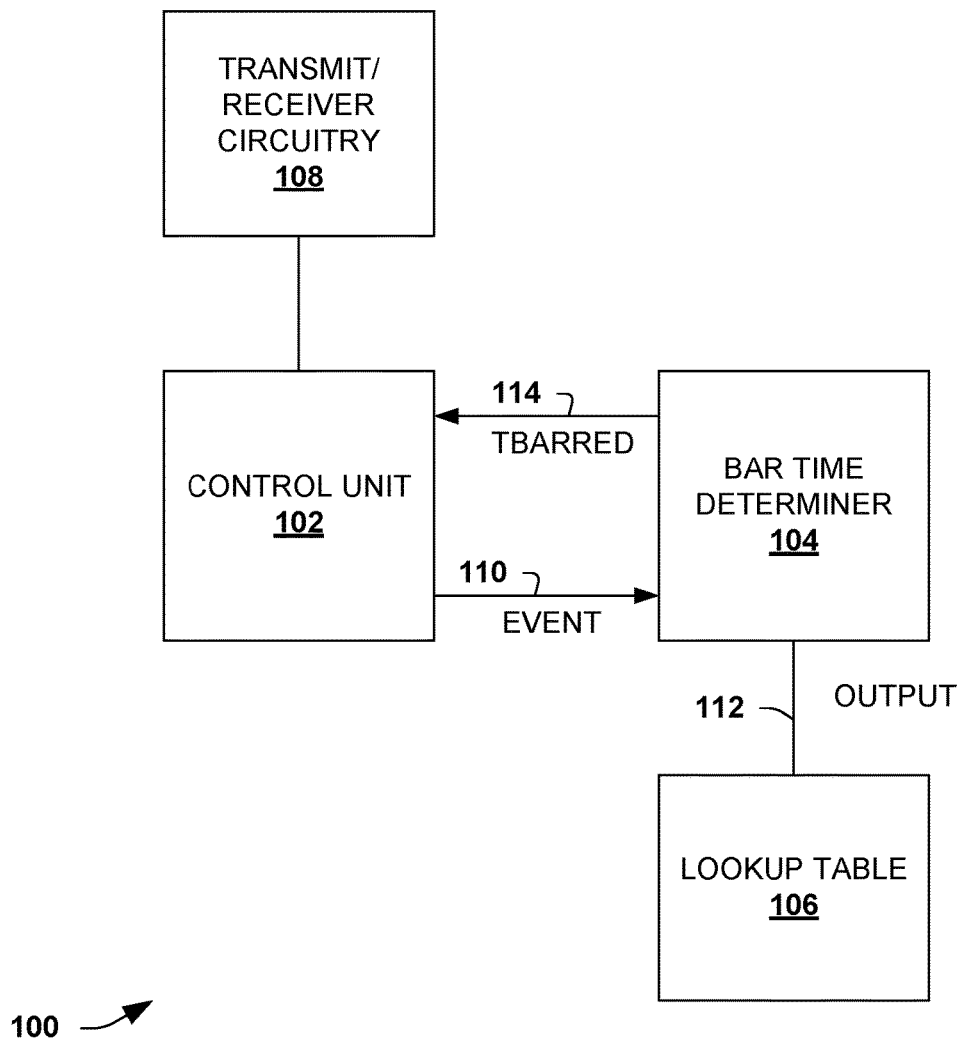
FIG. 1 is a block diagram illustrating a wireless device configured to use varied cell barring times.

The systems and methods of this disclosure are described with reference to the attached drawing figures, wherein like reference numerals are used to refer to like elements throughout, and wherein the illustrated structures and devices are not necessarily drawn to scale.

The subject innovation is now described with reference to the drawings, wherein like reference numerals are used to refer to like elements throughout. In the following description, for purposes of explanation, numerous specific details are set forth in order to provide a thorough understanding. It may be evident, however, that the embodiments of the disclosure may be practiced without these specific details. In other instances, well-known structures and devices are shown in block diagram form in order to facilitate describing the embodiments of the disclosure.

As used in this application, the terms "component," "platform," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. As utilized herein, the term "prosumer" indicate the following contractions: professional-consumer and producer-consumer.

The following abbreviations are relevant to the subject specification.

3G Third Generation
4G Fourth Generation
3GPP Third Generation Partnership Project
AGPS Assisted GPS
AP Access Point
ADSL Asymmetric Digital Subscriber Line AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
E-UTRAN Evolved Universal Terrestrial Radio Access Network
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
LTE Long Term Evolution
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL FIG. 1 is a block diagram illustrating a wireless device 100 configured to use varied cell barring times. The device 100 is described in simplified form to facilitate understanding. It is appreciated that additional components and variations are contemplated. The wireless device 100 can be incorporated into another device, arrangement, component and the like. In one example, the wireless device 100 is a UE.

In other approaches, if an attempt to select or reselect a cell is not successful, the cell is barred for a fixed or default, pre-determined period of time. For example, a protocol or standard may provide or assign a barring time that has been pre-determined. For some situations, using a fixed, pre-determined barring time can lead to a lack of communications in that the fixed time is too long. In other situations, the fixed barring time is too short and the user equipment attempts to select or reselect the cell frequently despite a low likelihood of success. Here, unnecessary power is consumed.

The wireless device 100 includes a control unit 102, a bar time determiner 104, a lookup table 108 and transmit (TX)/receiver (RX) circuitry 108. The control unit 102 is configured to perform operations associated with cell selection, reselection and/or barring the cell from selection. The control unit 102 is configured to attempt to select or reselect a cell via the TX/RX circuitry 108. The TX/RX circuitry 108 includes circuitry for sending and receiving data, including data/events associated with attempts to select or reselect a cell.

The attempt to select or reselect a cell can be successful or unsuccessful. If successful, the selected cell can be used for communication. The control unit 102 can include and/or be implemented in circuitry. Thus, it can be part of or include an application specific integrated circuit, an electronic circuit, a processor with memory, and the like.

In another example, the attempt to select or reselect the cell can be unsuccessful, meaning that the device 100 is not permitted to use this cell. The attempt can be unsuccessful for several reasons including, for example, system information not available, cell category, upper layer information, UE characteristics, UE states, cell size and the like. The reason for an unsuccessful attempt is also referred to as a barring reason and/or barring information.

The control unit 102 typically receives the barring reason/information from the TX/RX circuitry 108 and is configured to provide the barring reason as part of an event 110. The bar time determiner 104 receives the event 110 and determines a barring time 114 based at least partially on the event 110. The bar time determiner 104 provides the barring time 114, which is received by the control unit 102. The control unit 102 is configured to wait the barring time 114 before attempting to select or re-select the cell, thus preventing use of the cell prior to elapsing of the determined barring time 114. It is appreciated that the bar time determiner 104 is shown as a separate component, however the functionality of bar time determiner 104 can be incorporated into the control unit 102.

The barring time 114 is also referred to as a time value for the event 110. The barring time 114 is a period of time for which the device 100 is prevented from attempting to select or reselect the cell again.

The bar time determiner 104 is configured to determine the barring time 114 based on user equipment characteristics including, but not limited to, a predetermined event, user equipment characteristics, user equipment type, features, states, and the like. Alternately or in addition to, the bar time determiner 104 is also configured to determine the barring time 114 based on network component characteristics including, but not limited to, internal network aspects, cell size, network preferences and the like. The user equipment characteristics and the network component characteristics are typically provided with the event 110 as the cell response information.

The bar time determiner 104 has a default barring time, which can vary by implementation. For example, the default barring time can be 300 seconds, however other times are possible. If user equipment characteristics and/or network component characteristics do not lead to a change in the barring time, the default barring time can be provide as the barring time 114. Otherwise, the bar time determiner 104 uses the user equipment characteristics and/or network component characteristics to determine the barring time 114. It is appreciated that the bar time determiner 104 can utilize the characteristics to reference the lookup table 106 to obtain the appropriate information. Various examples of user equipment characteristics and example variations from the default barring time are provided below.

Category information from the cell that the wireless device 100 is attempting to select or reselect indicates UE categories supported by that cell. UE Categories typically indicate levels of performance, including data rate. Higher categories, such as category 12, have higher performance, including higher data rates, than lower categories, such as category 0. The category 0 is a low performance, low data rate and low cost category that may be suitable for UEs used in certain machine to machine type applications such as remote monitoring. A cell may not support communication with all UE categories, for example a cell may not support communication with category 0 UEs because the cell may have been developed before the category 0 was defined in the specifications. Category information from the cell may be broadcast in system information and may indicate that the cell does or does not support category 0 UEs. If the category information from the cell indicates that a needed UE category is not supported, longer barring times than the default barring time may be applied as the support status may not be likely to change in a short time. Thus, in this example, the bar rate determiner 104 sets the barring time 114 to a longer value, such as 500 seconds or 1000 s or 1 hour. While the description uses an example of category 0, a similar case may apply with a future as yet undefined category.

System information is broadcast from/about a cell and can reflect or include various network characteristics related to that cell. The information can include cell identify, cell barred status, cell status, close subscriber group (CSG) indication, CSG identify, intra frequency selection and the like. As shown, the system information can indicate that the cell is barred. In such a situation, the bar time determiner 104 may determine that a longer barring time is appropriate. In another example, the system information can be deficient and/or missing information. Such situations indicate the possibility that the requested cell is not operating properly. The bar time determiner 104 typically extends the barring time 114 for longer than the default barring time for this situation.

One network characteristic is the frequency band of the cell and is typically provided as part of the system information. The frequency band indicates a range of usable or supported frequencies to which the cell belongs. One user equipment characteristic is the set of frequency bands that the user equipment supports. If the frequency band of the cell does not belong to the set of frequency bands supported by the UE then the UE is not permitted to access the cell and will determine that the cell is to be treated as barred. In this situation the device 100 may apply a barring time that is different from the default barring time. Typically the barring time may be longer than the default barring time, as the situation is unlikely to have changed upon expiry of the barring time.

Upper layer information or triggers can indicate that there is a problem with the requested cell. The upper layer triggers can include, for example, failure of the device 100 to authenticate the network which could indicate that the cell or network is not genuine. The upper layer triggers, in one example, can cause the device 100 to treat the cell as barred and the bar time determiner 104 generating a barring time 114 different from than the default barring time.

Another example of user equipment characteristics includes fixed characteristics or aspects of the user equipment. Thus, these characteristics do not change over time. For example, the fixed characteristics can indicate power consumption as a priority which may be the case for a battery powered device which is required to have extremely long battery life time, leading to longer barred times in order to mitigate power consumption. As another example, the fixed characteristic may be that the device is a public safety device. For this public safety characteristic, fast acquisition of a cell and establishing communication is a priority and, as a result, shorter barring times may be preferred.

User equipment states are characteristics that require or suggest barred times according to particular states. For example, a low mobility state indicates that the user equipment is stationary or has low mobility. As a result, the cells available to the wireless device 100 are likely to be relatively static. Typically, longer barring times may be used for the low mobility state as a barred cell is likely to remain barred. In contrast, a high mobility state indicates that the user equipment is highly mobile. Thus, the cells available to the wireless device 100 are changing rapidly and shorter barring times are helpful.

The network component characteristics can also be considered by the bar time determiner 104 in generating the barring time 114. The network component characteristics, as described above, include cell size, network preference, network rules based on a network specification, mobility and the like.

The bar time determiner 104 can consider one or a plurality of user equipment characteristics and/or network component characteristics in determining the barring time 114. In the case of multiple characteristics being considered, the determiner can assign weights to the characteristics in order to develop the barring time 114. In another example, the bar time determiner 104 can calculate offsets from the default barring time according to each identified UE characteristic and/or network component characteristic and add the offsets to determine an overall offset for the wireless device 100. The offsets can be enumerated and stored in the lookup table 106.

The bar time determiner 104 uses a suitable mechanism to determine the barring time 114 based on the event 110. In one example, barring time offsets for the UE and network component characteristics are enumerated in a specification and/or stored within the lookup table 106. The time offsets can be specified per characteristic. In another example, the mechanism uses the default barring time as the barring time 114 unless a specific category is used, such as category 0.

Figure 2:
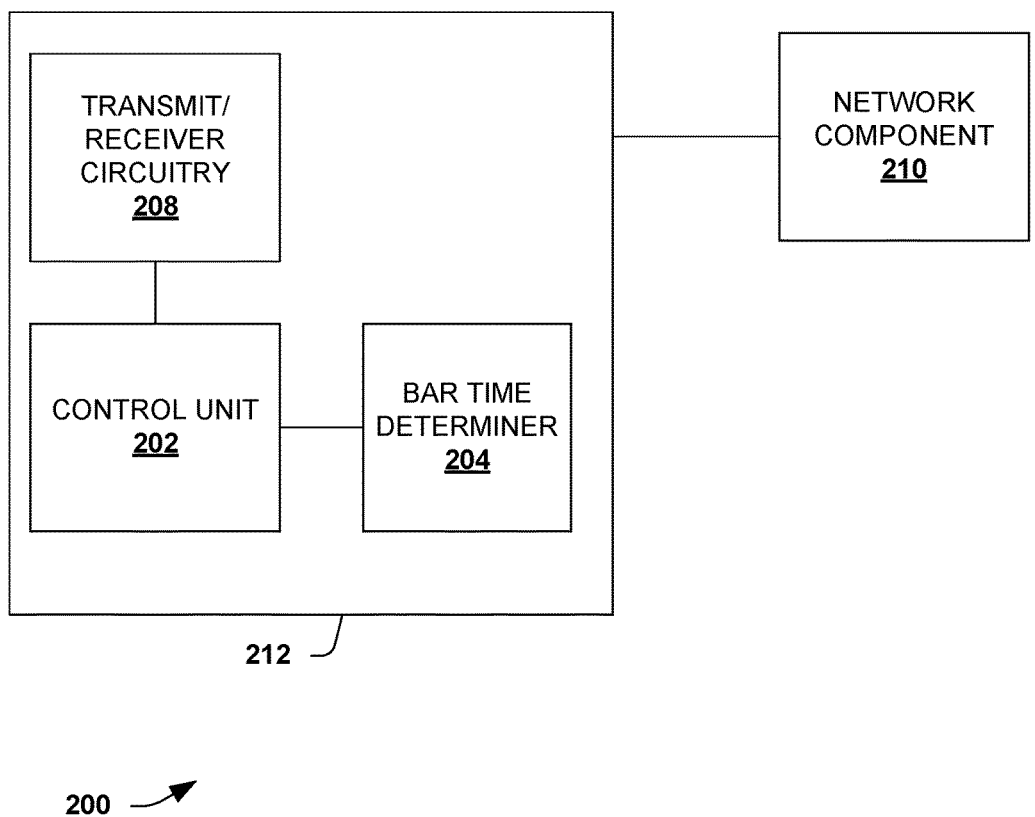
FIG. 2 is a diagram illustrating a communication system arrangement configured to use varied cell barring times.

FIG. 2 is a diagram illustrating a communication system arrangement 200 configured to use varied cell barring times and having a bar time determiner within user equipment. The arrangement 200 determines and adjusts cell barring times primarily based on user equipment characteristics.

The arrangement 200 includes user equipment 212 and a network component 210. The network component 210 is a wireless network component, such as a base station, access point, node B, home node B, and the like. The network component 210 controls one or more cells. In one example, the network component 210 includes three cells assigned for 3 sectors. In another example, the network component 210 includes over 20 cells. It is appreciated that the cells can be at a physical location separate from the network component 210.

Each cell has associated system information including, for example, supported operating frequencies, supported UE categories, supported barring times and the like. The supported operating frequencies include ranges or bands of frequencies supported by the cell. The supported UE categories indicates which categories of UE are supported. The categories indicate levels of performance and complexity, including data rate. Higher categories, such as category 12, have higher performance and higher complexity, including higher data rates, than lower categories, such as category 0. The category 0 is a low performance and low data rate category. The supported barring times indicate permitted barring times that may be applied by the user equipment 212. The supported barring times can include a range of values and/or an enumerated list of barring times for the cell.

The user equipment 212 includes transmit/receiver (TX/RX) circuitry 208, a bar time determiner 204 and a control unit 202. Additional description for these components is found above with regards to FIG. 1. The control unit 202 is configured to perform operations associated with cell selection, reselection and/or barring the cell from selection.

The control unit 202 typically receives the barring reason/information from the TX/RX circuitry 208. The control unit 202 passes some or all of the barring reason/information to the bar time determiner 204.

The bar time determiner 204 is configured to determine the barring time, which is a period of time that the user equipment 212 is prevented or barred from requesting the same cell. In this example, the bar time determiner 204 is configured to determine the barring time based on user equipment characteristics and is based on the barring reason/information, as described above with regards to the system 100.

In one example, the bar time determiner 204 obtains a list of supported or allowed barring times based on system information for the cell. One of the times in the list is selected as a default time. Then, based on the user equipment characteristics, an other time in the list, longer or shorter than the default time, can be selected as the barring time for the requested cell. The barring time is provided to the control unit 202, which waits the barring time until re-requesting the cell.

Figure 3:
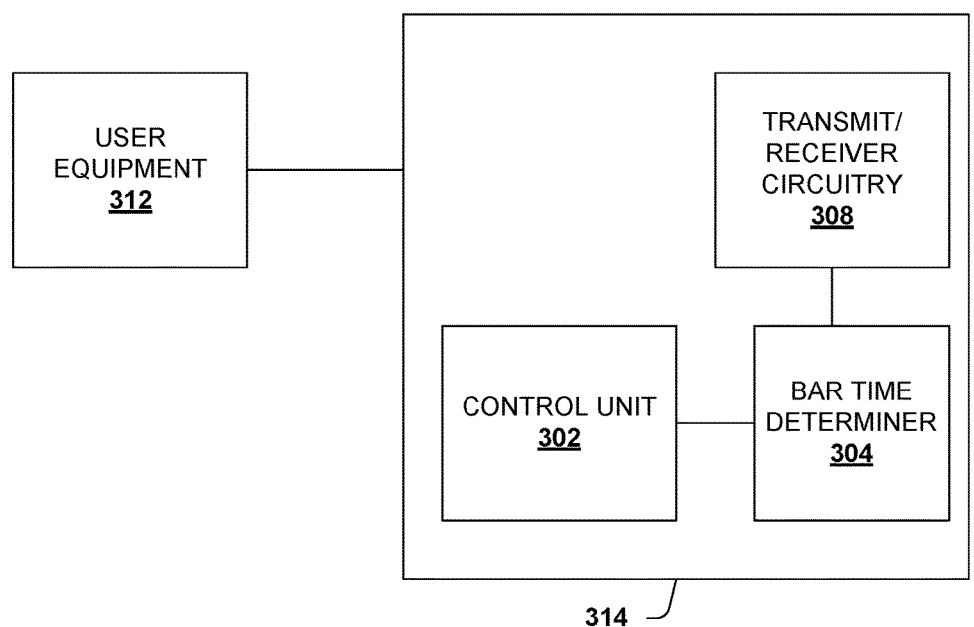
FIG. 3 is a diagram illustrating a communication system arrangement configured to use varied cell barring times.

FIG. 3 is a diagram illustrating a communication system arrangement 300 configured to use varied cell barring times. The arrangement 300 determines and adjusts cell barring times primarily based on network component characteristics.

The arrangement 300 includes user equipment 312 and a network component 314. The user equipment 312 can be a mobile station, mobile device and the like and is a device utilized by a subscriber or user of a wireless communication service to receive or convey data, control, voice, and the like.

The user equipment 312 can be implemented as or similar to the user equipment 212 described above. Further, the user equipment 312 can be used in the wireless device 100. Generally, the user equipment 312 selects or re-selects a cell from the network component 314. The network component 314 provides information related to or associated with the cell. The user equipment determines whether the cell selection is successful or unsuccessful. If successful, the requested cell may be used for communication by the user equipment 312. If unsuccessful, also referred to as being barred, the requested cell cannot be used and a barring time is determined.

In this example, if the cell is barred, a barring component 304 determines or provides a barring time based on network characteristics. The barring time is a period of time in which the user equipment is prevented from re-requesting the cell. The barring component 304 is shown within the network component 314, but can also be within the user equipment 312.

The network component 314 includes transmit/receive (TX/RX) circuitry 308, a control unit 302 and a network component bar time determiner 304. The TX/RX circuitry 308 is configured to transmit and receive information with other devices including, but not limited to, the user equipment 312.

In response to a cell selection from the user equipment 312, the TX/RX circuitry 308 conveys the cell selection to the control unit 302. If the cell is available and supports the request, the cell selection is successful. Otherwise, the selection is unsuccessful and response information and/or event is generated that includes system information and a barring time.

The control unit 302 is configured to analyze the cell selection to determine if the requested cell supports the user equipment. For example, the user equipment may only support frequency bands or request a category not supported by the requested cell.

The bar time determiner 304 is invoked upon the cell requested for selection being barred. The bar time determiner 304 analyzes network characteristics to determine whether the barring time should be at a default value or be varied from the default value by an offset amount. The determiner 304 is configured to determine the barring time based on network component characteristics including, but not limited to, internal network aspects, cell size, network preferences and the like. The above description of system 100 provides some examples of varied barring times that can be generated based on network characteristics.

In one example, the cell selection is for a first frequency band. If the band is outside the range of the requested cell, the barring time is adjusted by an offset value to be longer than the default value. Additionally, the bar time determiner 304 can provide additional barring information, such as barring other cells of the network component that do not meet the frequency band of the user equipment 312. In another example, the cell selection includes a category of service. If the requested category of service is not supported by the component 314 based on the network characteristics, a longer barring time is generated.

Figure 4A:
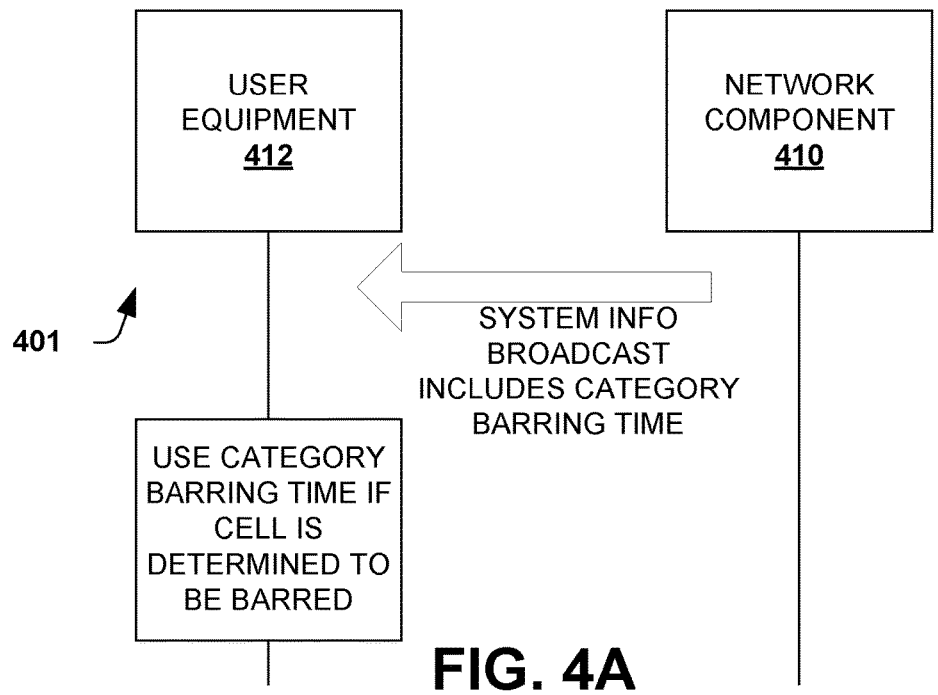
FIG. 4A is a diagram illustrating an arrangement where system information includes a category barring time.
Figure 4B:
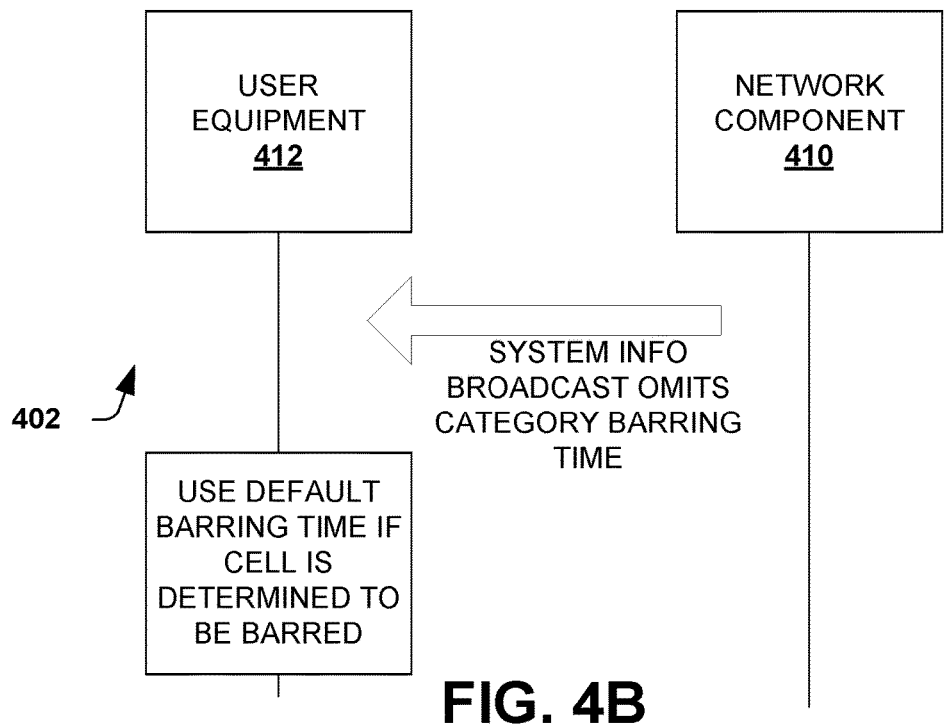
FIG. 4B is a diagram illustrating an arrangement where system information omits a category barring time.

FIGS. 4A and 4B provide a more detailed example of determining a barring time for an unsuccessful attempt to select or reselect a cell. It is appreciated that the example is provided to facilitate understanding and that other mechanisms and approaches can be used to determine the barring time.

FIG. 4A is a diagram illustrating an arrangement 401 where system information broadcast by a cell includes a category barring time. Here, the arrangement 401 includes user equipment 412 and a network component 410. Additional details for the equipment 412 and the component 410 are provided in the above descriptions of FIGS. 1-3.

The user equipment 412 attempts to select or reselect a cell for communication purposes. The UE 412 receives the broadcast system information from the cell. The system information content indicates that the UE 412 is not permitted or is barred to access the cell, for example due to the UE 412 being a category 0 UE and the system information indicating that the cell does not support category 0 UEs. Here, the system information includes a category barring time which is a barring time to be used by the UE 412 in the case that the UE 412 considers the cell a barred due to it not supporting the category of the UE. This barring time is based on the category of UE that is not supported by the cell.

The user equipment 412 waits the category barring time and re-attempts to select or reselect the cell. Alternately, the user equipment 412 can attempt to select or reselect a different cell. If the UE 412 considers the cell as barred but for a reason different from the cell not supporting the category of the UE, then the UE would not bar the cell according to the category barring time but would bar the cell according to the default barring time.

FIG. 4B is a diagram illustrating an arrangement 401 where system information broadcast by a cell omits a category barring time. The arrangement 401 includes user equipment 412 and a network component 410. Additional details for the equipment 412 and the component 410 are provided in the above descriptions of FIGS. 1-3.

The user equipment 412 attempts to select or reselect a cell for communication purposes. The UE 412 receives the broadcast system information from the cell. The system information content indicates that the UE is not permitted or is barred to access the cell, for example due to the UE being a category 0 UE and the system information indicating that the cell does not support category 0 UEs. Here, unlike in FIG. 4A, the system information does not specify a category barring time. However, the system information can include other information.

The user equipment 412 determines the barring time based on characteristics including network component characteristics and/or user equipment characteristics. The user equipment 412 waits the determined barring time and can re-attempt to select or reselect the cell. It is appreciated that the determined barring time can be a default barring time.

Figure 5:
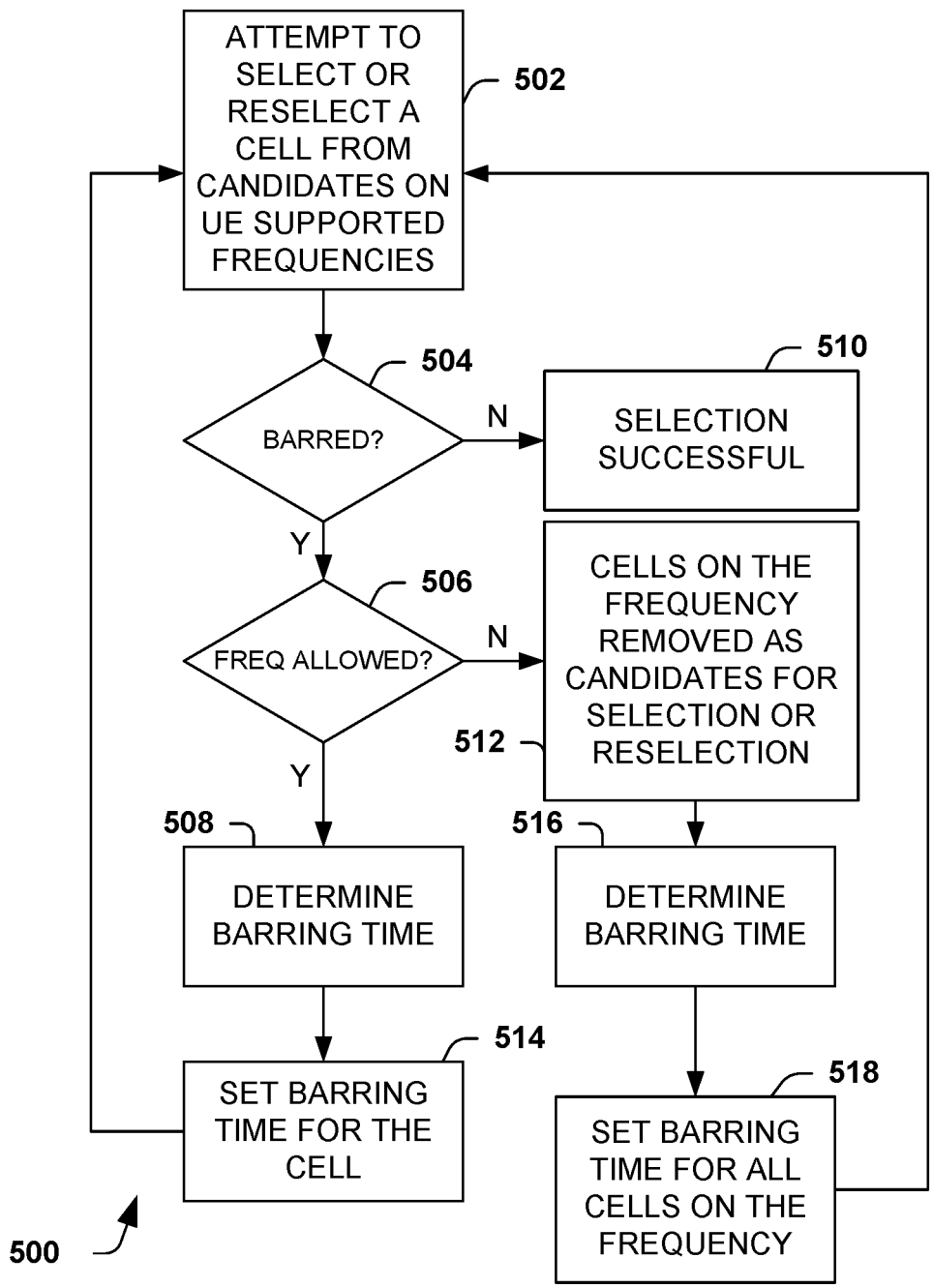
FIG. 5 is a flow diagram illustrating a method of determining varied barring times including analyzing user equipment supported frequencies.

FIG. 5 is a flow diagram illustrating a method 500 of determining varied barring times including analyzing user equipment supported frequencies. The method 500 is provided as a more detailed example of determining barring times while analyzing supported categories of service and supported frequencies.

A user equipment is of a certain user equipment category, for example category 0 and the user equipment supports operation in a set of supported frequencies.

The user equipment attempts to select or reselect a cell at block 502. The cell for selection is typical chosen from a list of candidate cells. These candidate cells can be pre-selected to be cells that operate at frequencies supported by the user equipment.

The user equipment determines whether the cell selection or reselection is successful or unsuccessful at block 504. In determining whether the cell selection is successful, the user equipment determines whether the cell supports the user equipment. The cell is barred or unsuccessful if the cell does not support the desired services and/or characteristics. For example, if the user equipment is category 0 and the selected cell does not have this capability, the selection is barred/unsuccessful.

If the selected cell is not barred, the selection is successful at block 510 and the user equipment can use the cell for communications. Otherwise, the cell is barred.

If the selected cell is barred then user equipment determines whether other cells of the same frequency as the barred cell are permitted or allowed to be selected or reselected. The user equipment may determine this based on an 'allowed' or 'not allowed' indicator that is broadcast by the network in system information. If the user equipment is not allowed to select or reselect other cells on the same frequency then the one or more cells are removed as candidates for reselection at block 512. Typically, this removes cells as candidates that have the same frequency as the requested cell. As a result, unnecessary cell selection or reselection attempts that are not supported by the one or more cells are avoided.

A barring time for the one or more cells is determined at block 516. The barring time can be determined by a component, such as the bar time determiner component described above. Then, the barring time is set for the cell and the one or more cells at block 518. The method 500 continues to block 502 and the user equipment waits the determined barring time for the one or more cells before selecting any of the one or more cells.

If, at block 506, the user equipment is allowed to select or reselect other cells on the same frequent then a barring time for the barred cell is determined at block 508. The barring time can be determined by a component, such as the bar time determiner component described above.

The determined barring time is set for the cell at block 514 and the method returns to block 520, where the user equipment waits for the barring time before selecting or reselecting the cell again.

Figure 6:
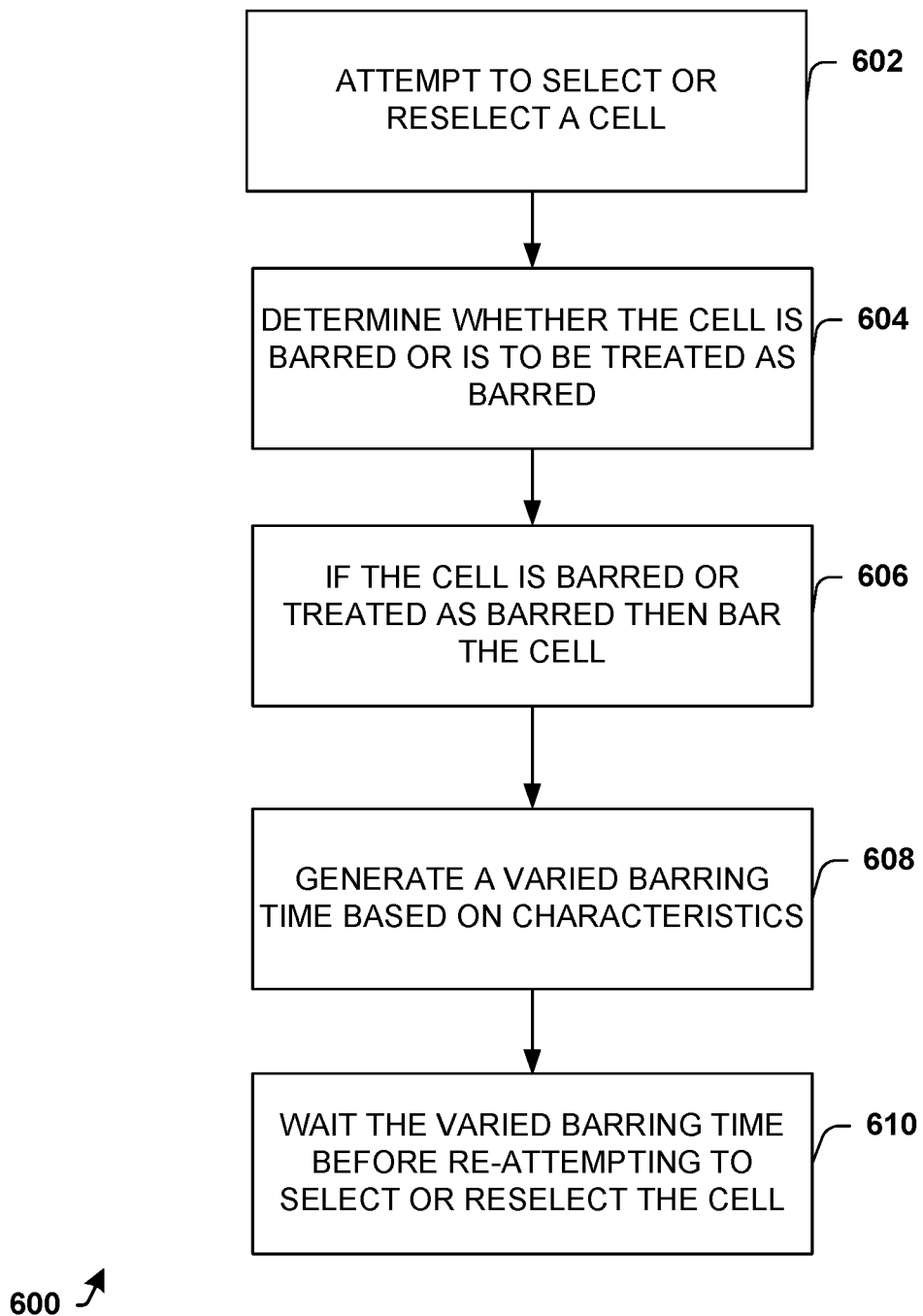
FIG. 6 is a flow diagram illustrating a method of using varied cell barring times.

FIG. 6 is a flow diagram illustrating a method 600 of using varied cell barring times. The method 600 determines cell barring times that facilitate performance while mitigating power consumption. The method 600 considers user equipment characteristics and network component characteristics in setting or determining the barring times.

The method begins at block 602, where the user equipment attempts to select or reselect a cell from a network component. The user equipment related information, such as a category of service, supported frequencies, fixed characteristics of the user equipment and the like may be considered in the selection or reselection attempt.

The user equipment determines whether the cell is barred or is to be treated as barred at block 604.

If the cell is barred or is to be treated as barred then the user equipment bars the cell at block 606.

A varied barring time is generated for the requested cell by a bar time determiner at block 608. The varied barring time can be determined by a component, such as the bar time determiner component described above.

The user equipment selects or re-selects the cell after waiting the varied barring time at block 610. The method 600 can then proceed to block 604.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required. Further, one or more of the acts depicted herein may be carried out in one or more separate acts or phases.

Figure 7:
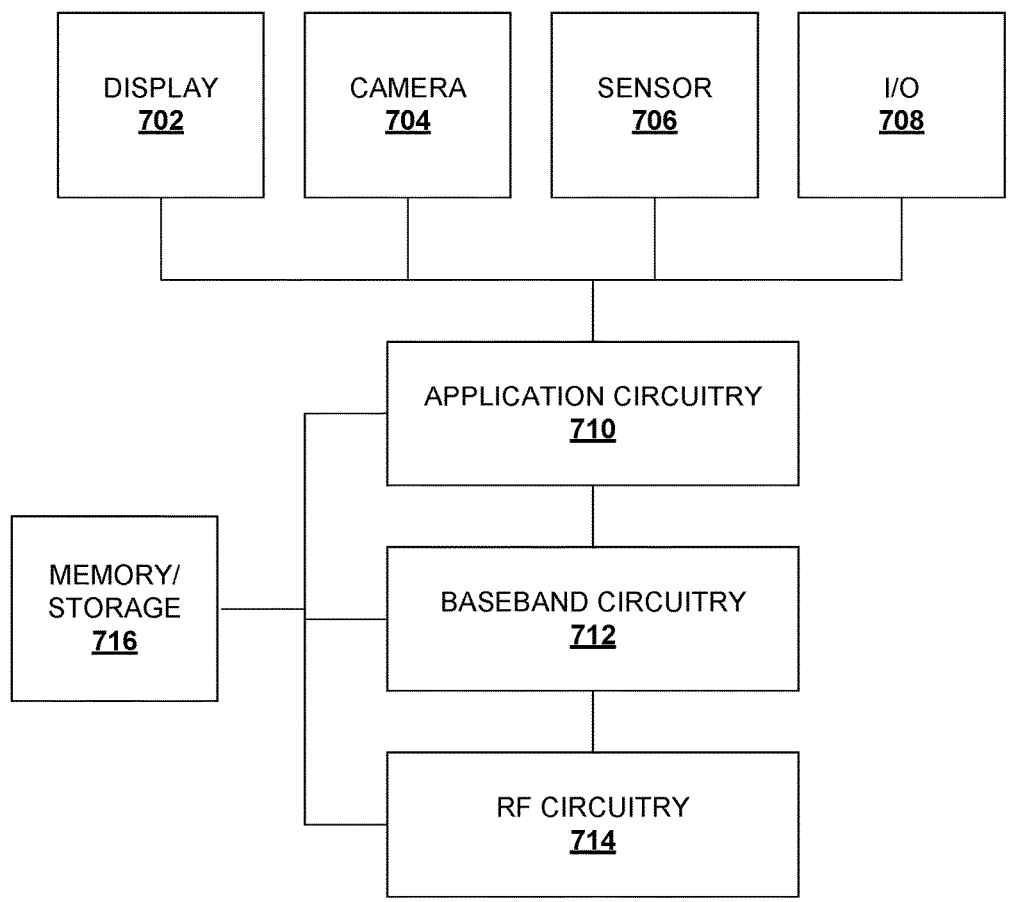
FIG. 7 is a block diagram illustrating an example of suitably configured hardware and/or software system.

It is noted that the above systems, methods, arrangements and components may be implemented into a system using suitably configured hardware and/or software. FIG. 7 provides an example of such a system.

FIG. 7 is block diagram illustrating an example of suitably configured hardware and/or software system 700. The system 700 includes radio frequency (RF) circuitry 714, baseband circuitry 712, application circuitry 710, memory/storage 716, a display 702, a camera 704, a sensor 706 and an input/output (I/O) interface 708 coupled with each other as shown.

The application circuitry 710 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 716 and configured to execute instructions stored in the memory/storage 716 to enable various applications and/or operating systems running on the system 700.

The baseband circuitry 712 may include circuitry such as, but not limited to, one or more single-core or multi-core processors. The processor(s) may include a baseband processor. The baseband circuitry 712 may handle various radio control functions that enables communication with one or more radio networks via the RF circuitry 714. The radio control functions may include, but are not limited to, signal modulation, encoding, decoding, radio frequency shifting, etc. In some embodiments, the baseband circuitry 712 may provide for communication compatible with one or more radio technologies. For example, in some embodiments, the baseband circuitry 712 may support communication with an evolved universal terrestrial radio access network (EU-TRAN) and/or other wireless metropolitan area networks (WMAN), a wireless local area network (WLAN), a wireless personal area network (WPAN). In some examples, the baseband circuitry 712 is configured to support radio communications of more than one wireless protocol may be referred to as multi-mode baseband circuitry.

The baseband circuitry 712 may include circuitry to operate with signals that are not strictly considered as being in a baseband frequency. For example, the baseband circuitry 712 may include circuitry to operate with signals having an intermediate frequency, which is between a baseband frequency and a radio frequency.

The RF circuitry 714 may enable communication with wireless networks using modulated electromagnetic radiation through a non-solid medium. In various embodiments, the RF circuitry 714 may include switches, filters, amplifiers, etc. to facilitate the communication with the wireless network.

The RF circuitry 714 may include circuitry to operate with signals that are not strictly considered as being in a radio frequency. For example, in some embodiments, the RF circuitry 714 may include circuitry to operate with signals having an intermediate frequency, which is between a baseband frequency and a radio frequency.

It is noted that some or all of the constituent components of the baseband circuitry 712, the application circuitry 710, and/or the memory/storage 716 may be implemented together on a system on a chip (SOC).

The memory/storage 716 may be used to load and store data and/or instructions, for example, for system. The memory/storage 716 for one example may include any combination of suitable volatile memory (e.g., dynamic random access memory (DRAM)) and/or non-volatile memory (e.g., Flash memory).

The I/O interface 708 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

The sensor 706 may include one or more sensing devices to determine environmental conditions and/or location information related to the system. In some embodiments, the sensor(s) may include, but are not limited to, a gyro sensor, an accelerometer, a proximity sensor, an ambient light sensor, and a positioning unit. The positioning unit may also be part of, or interact with, the baseband circuitry 712 and/or RF circuitry to communicate with components of a positioning network, e.g., a global positioning system (GPS) satellite.

The display 702 may include a display (e.g., a liquid crystal display, a touch screen display, etc.).

The system 700 may be a mobile computing device such as, but not limited to, a laptop computing device, a tablet computing device, a netbook, an ultrabook, a smartphone, etc. In various embodiments, system may have more or less components, and/or different architectures.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

It is also to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Moreover, various aspects or features described herein can be implemented as a method, apparatus, or article of manufacture using standard programming and/or engineering techniques. As described above, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a user equipment having varied cell barring times. The system includes first circuitry, second circuitry and third circuitry. The first circuitry is configured to attempt cell selection of a cell and obtain a barring reason associated with the cell upon the cell being barred. The second circuitry is configured to determine a varied barring time at least partially based on the barring reason and one or more system characteristics. The third circuitry is configured to bar the cell for the determined barring time.

Example 2 includes the subject matter of example 1, where the first circuitry is further configured to attempt cell reselection of the cell after waiting the determined barring time.

Example 3 includes the subject matter of any of examples 1-2, including or omitting optional elements, where the barring reason includes that the cell does not support a category of the user equipment.

Example 4 includes the subject matter of any of examples 1-3, including or omitting optional elements, where the determined barring time is greater than a pre-determined barring time.

Example 5 includes the subject matter of any of examples 1-4, including or omitting optional elements, where the barring reason includes that the user equipment operates at category 0 and the cell does not support the category 0.

Example 6 includes the subject matter of any of examples 1-5, including or omitting optional elements, where the one or more system characteristics include that the user equipment is a public safety device.

Example 7 includes the subject matter of any of examples 1-6, including or omitting optional elements, where Example 8 includes the subject matter of any of examples 1-7, including or omitting optional elements, where the system characteristics include user equipment characteristics and network component characteristics.

Example 9 includes the subject matter of any of examples 1-8, including or omitting optional elements, where the system characteristics include fixed characteristics.

Example 10 includes the subject matter of examples 1-9, where the system characteristics include a category of service for the user equipment.

Example 11 includes the subject matter of any of examples 1-10, including or omitting optional elements, where the system characteristics include a mobility state of the user equipment.

Example 12 includes the subject matter of any of examples 1-11, including or omitting optional elements, further comprising a lookup table configured to store a plurality of offsets and wherein the second circuitry obtains the offset from the lookup table using the system characteristics as a reference.

Example 13 is a communication system having varied cell barring times. The system includes circuitry, a control unit and a bar time determiner. The circuitry is configured to receive network characteristics from a wireless network component. The control unit is configured to attempt cell selection for a cell. The bar time determiner is configured to generate a varied barring time at least partially based on the network characteristics upon the cell being barred.

Example 14 includes the subject matter of example 13, including or omitting optional elements, where the network characteristics indicate that a user equipment category is not supported.

Example 15 includes the subject matter of any of examples 13-14, including or omitting optional elements, where the network characteristics indicate that a user equipment operating frequency is not supported by the wireless network component.

Example 16 includes the subject matter of any of examples 13-15, including or omitting optional elements, where the circuitry is configured to receive system information that includes an enumerated list of allowed barring times.

Example 17 includes the subject matter of any of examples 13-16, including or omitting optional elements, where the varied barring time is less than a default value network value specified in the network characteristics.

Example 18 is a computer-readable storage device. The device stores executable instructions that, in response to execution, cause a system comprising a processor to perform operations. The operations include the following: A user equipment attempts to select a cell. Whether to bar the cell is determined. Barring information is generated upon barring the cell. A varied barring time is generated based on user equipment characteristics and the barring information.

Example 19 includes the subject matter of example 18, including or omitting optional elements, where the user equipment has an associated user equipment category.

Example 20 includes the subject matter of any of examples 18-19, including or omitting optional elements, where the response information includes system information related to a wireless network component.

Example 21 is user equipment comprising circuitry. The circuitry attempts to select a cell for communication. The circuitry determines whether to bar the cell. The circuitry determines barring information upon the cell being barred. Additionally, the circuitry generates a varied barring time based upon user equipment characteristics and the barring information.

Example 22 includes the subject matter of any of example 21, including or omitting optional elements, where the attempt to select the cell has an associated user equipment category.

Example 23 includes the subject matter of any of examples 21-22, including or omitting optional elements, where the response information includes system information.

Although embodiments of the present disclosure has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the embodiments provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated example implementations. The component or structure includes a processor executing instructions in order to perform at least portions of the various functions. In addition, while a particular feature may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A user equipment having varied cell barring times, the user equipment comprising:
   first circuitry configured to attempt cell selection of a cell and obtain barring information associated with the cell upon the cell being barred; and
   second circuitry configured to determine a varied barring time at least partially based on the barring information and one or more system characteristics, wherein the varied barring time is a period of time before an additional attempt of cell selection of the cell can be performed;
   third circuitry configured to bar the cell for the determined barring time;
   wherein the barring information includes that the user equipment operates at category 0 and the cell does not support the category 0, wherein the category 0 comprises that the user equipment operates at a low performance and low data rate; and
   a lookup table configured to store a plurality of offsets and wherein the second circuitry obtains an offset from the lookup table using the system characteristics as a reference.

2. The user equipment of claim 1, wherein the first circuitry is further configured to attempt cell reselection of the cell after waiting the determined barring time.

3. The user equipment of claim 1, wherein the barring information includes that the cell does not support a category of the user equipment.

4. The user equipment of claim 1, wherein the determined barring time is greater than a pre-determined barring time.

5. The user equipment of claim 1, wherein the one or more system characteristics include that the user equipment is a public safety device.

6. The user equipment of claim 1, wherein the determined barring time is less than a pre-determined barring time.

7. The user equipment of claim 1, wherein the system characteristics include user equipment characteristics and network component characteristics.

8. The user equipment of claim 1, wherein the system characteristics include fixed characteristics.

9. The user equipment of claim 1, wherein the system characteristics includes a category of service for the user equipment.

10. The user equipment of claim 1, wherein the system characteristics include a mobility state of the user equipment.

11. A communication system having varied cell barring times, the system comprising:
    circuitry configured to receive network characteristics from a wireless network component;
    a control unit configured to attempt cell selection for a cell; and
    a bar time determiner configured to generate a varied barring time at least partially based on the network characteristics upon the cell being barred, wherein the varied barring time is a period of time before an additional attempt of cell selection of the cell can be performed;
    wherein the barring information includes that the user equipment operates at category 0 and the cell does not support the category 0, wherein the category 0 comprises that the user equipment operates at a low performance and low data rate; and
    a lookup table configured to store a plurality of offsets and wherein the circuitry obtains an offset from the lookup table using the network characteristics as a reference.

12. The system of claim 11, wherein the network characteristics indicate that a user equipment category is not supported.

13. The system of claim 11, wherein the network characteristics indicate that a user equipment operating frequency is not supported by the wireless network component.

14. The system of claim 11, wherein the circuitry is configured to receive system information that includes an enumerate list of allowed barring times.

15. The system of claim 11, wherein the varied barring time is less than a default network value specified in the network characteristics.

16. A computer-readable storage device storing executable instructions that, in response to execution, cause a system comprising a processor to perform operations, comprising:
   attempting to select a cell by a user equipment;
   determining whether to bar the cell;
   generating barring information upon barring the cell;
   generating a varied barring time based on user equipment characteristics and the barring information, wherein the varied barring time is a period of time before an additional attempt of cell selection of the cell can be performed;
   wherein the barring information includes that the user equipment operates at category 0 and the cell does not support the category 0, wherein the category 0 comprises that the user equipment operates at a low performance and low data rate; and
   using a lookup table configured to store a plurality of offsets and obtaining an offset from the lookup table based on the user equipment characteristics.

17. The computer-readable storage device of claim 16, wherein the user equipment has an associated user equipment category.

18. The computer-readable storage device of claim 16, wherein the barring information includes system information related to a wireless network component.

* * * * *